US005401035A

United States Patent [19]

Schoenmaekers

[11] Patent Number: 5,401,035

[45] Date of Patent: Mar. 28, 1995

[54] CIRCUMFERENTIAL SEAL FOR A VACUUM PRESSURE CHAMBER ON A METERING DEVICE

[76] Inventor: Johannes G. Schoenmaekers, Raar 8A, NL-6231 RR Meerseen, Netherlands

[21] Appl. No.: 97,090

[22] Filed: Jul. 23, 1993

[30] Foreign Application Priority Data

Jul. 29, 1992 [DE] Germany .......................... 9210134 U

[51] Int. Cl.$^6$ .......................... F16J 15/40

[52] U.S. Cl. .......................... 277/27; 277/83; 277/173; 111/185

[58] Field of Search .......................... 277/27, 83, 92, 96, 277/96.1, 96.2, 165, 173; 111/183, 184, 185

[56] References Cited

U.S. PATENT DOCUMENTS 1,315,822 9/1919 Doran .......................... 277/96.1 X
2,710,206 6/1955 Huber .......................... 277/92
3,057,630 10/1962 Sneed .......................... 277/165
3,990,606 11/1976 Gugenhan .......................... 111/185 X
4,346,903 8/1982 Heiermann .......................... 277/165 X
4,614,348 9/1986 Fournier .......................... 277/165 X
4,664,290 5/1987 Martin et al. .......................... 111/185 X
5,058,766 10/1991 Deckler .......................... 111/184 X
5,071,318 12/1991 Bice et al. .......................... 277/27 X

FOREIGN PATENT DOCUMENTS 0195900 10/1986 European Pat. Off. .......... 111/185
8505231 U 2/1985 Germany .

*Primary Examiner*—William A. Cuchlinski, Jr.
*Assistant Examiner*—John L. Beres
*Attorney, Agent, or Firm*—Collard & Roe

[57] ABSTRACT

A circumferential seal for the clearance space or gap between a vacuum pressure chamber formed by a trough-shaped casing and a revolving transporting disk of a metering device for sealing the vacuum pressure chamber, and preferably, it is used for a single-grain sowing machine.

5 Claims, 1 Drawing Sheet

12 13 14 19 11 1 2 3 32 6 30 7 8 4 5 9 10 21 17

CIRCUMFERENTIAL SEAL FOR A VACUUM PRESSURE CHAMBER ON A METERING DEVICE

BACKGROUND OF THE INVENTION

1. Field of the Invention

The present invention relates to a metering device and a circumferential seal for the clearance space or gap between a vacuum pressure chamber formed by a trough-shaped casing and a revolving transporting disk for sealing the vacuum pressure chamber, and preferably, for a single-grain sowing machine.

2. The Prior Art

German utility model G 85 05 231.0 discloses a sowing unit for single-grain sowing machines. This unit has a vacuum pressure chamber of known construction. In this connection, a transporting disk serves for receiving and transporting individual seed grains from a supply source to the planting site where it is deposited. The vacuum that is applied cooperates with this transporting disk.

This prior art device has these disadvantages. The outer part of the transporting disk faces the vacuum pressure chamber, and the disk is slightly conical in shape for this purpose. The disk is pressed onto an annular circumferential seal made of felt mixed with graphite with the seal being arranged in the casing of the vacuum pressure chamber. This causes considerable friction to occur, which leads to the undesirable heating of the transporting disk and to rapid wear of the circumferential seal.

SUMMARY OF THE INVENTION

It is an object of the present invention to provide an improved circumferential seal and to avoid the aforementioned prior art drawbacks.

It is a further object to achieve a lower frictional effect and to achieve a superior sealing based upon the unique construction and material selection according to the invention.

Accordingly, the above objects are achieved according to the present invention by providing a circumferential seal for the clearance space gap between a vacuum pressure chamber formed between a trough-shaped casing and a revolving transporting disk of a metering device sealing the vacuum pressure chamber. An annular support body made of air-impermeable sealing material is arranged along the inside of the trough-shaped casing. The annular support body has a top side ending at a small spacing from the underside of the transporting disk and has on its outer edge a recess with a top side and with a step-like cross section. An O-ring made of air-impermeable, elastic material rests on the top side of said recess and has a cross sectional diameter greater than the spacing between the top side of the support body and the underside of the revolving transporting disk.

When the pneumatic vacuum is applied, the O-ring is lifted off from its support. Due to the pressure gradient between the vacuum pressure chamber and the ambient air outside the transporting disk, the O-ring presses itself firmly against the clearance space gap between the disk and the casing of the vacuum pressure chamber. Simultaneously, the O-ring seals this gap due to the linear contact between the transporting disk and the support body of the vacuum pressure chamber. Because of the small areas of contact and due to the relatively low forces of contact pressure, only negligibly small amounts of friction occur. Thus, the transporting disk is practically not heated.

In addition, the novel circumferential seal can be manufactured at low cost and does not require any maintenance. Furthermore, any deformation of the transporting disk is prevented.

BRIEF DESCRIPTION OF THE DRAWINGS

Other objects and features of the present invention will become apparent from the following detailed description considered in connection with the accompanying drawings which discloses embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
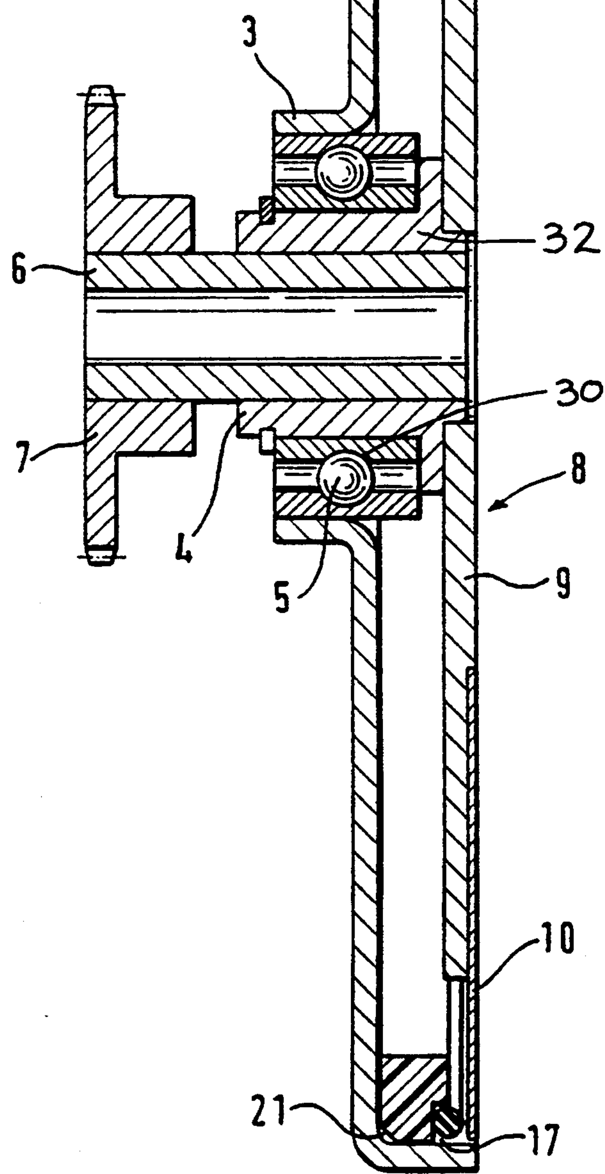
FIG. 1 shows a longitudinal cross section view through a vacuum pressure chamber according to the invention.

Turning now in detail to the drawings, FIG. 1 shows in a simplified form a vacuum pressure chamber 1 for a single-grain sowing machine.

Chamber 1 includes a trough-shaped casing 2, which is integrally attached to a bushing 3, and has a cover comprising a transporting disk 8.

The bushing 3 is seated on a ball bearing 5 in raceway 30 supported by a hub 4. The hub 4 in turn is seated on a drive shaft 6 and co-rotates with the drive shaft. The drive shaft supports a drive pinion 7.

The transporting disk 8 rotating with the drive shaft 6 is mounted on the free end 32 of the hub 4. The disk 8 is divided into a support plate 9 and a metering or distributing disk 10 fastened onto the support plate 9.

The vacuum port opening 11 is located in the casing 2, to which opening a pneumatic vacuum device is connectable.

Together with the edge 12 of the casing 2 of the vacuum pressure chamber 1, the metering disk 10 forms a clearance space or gap 13, which has to be sealed. For sealing purposes, an annular support body 14 comprising an elastic, smooth material that is impermeable to air and is made, for example, of plastic, such as a thermoplastic like polyethylene, is positioned on the inside of the edge 12 of the vacuum pressure chamber 1. The support body 14 is shown enlarged in FIG. 2 in partial section view.

The top side 15 of support body 14 ends with a small spacing from the underside 16 of the transporting disk 8. On its outer top edge, the support body 14 has a cut out notch or recess 17 with a step-like cross section. The top side 18 of recess 17 serves as a support for the O-ring 19 made of smooth, elastic material that is impermeable to air, for example natural rubber. The cross sectional diameter of the O-ring has to be greater than the spacing between the top side 15 of the support body 14 and the underside 16 of the transporting disk 8.

Figure 2:
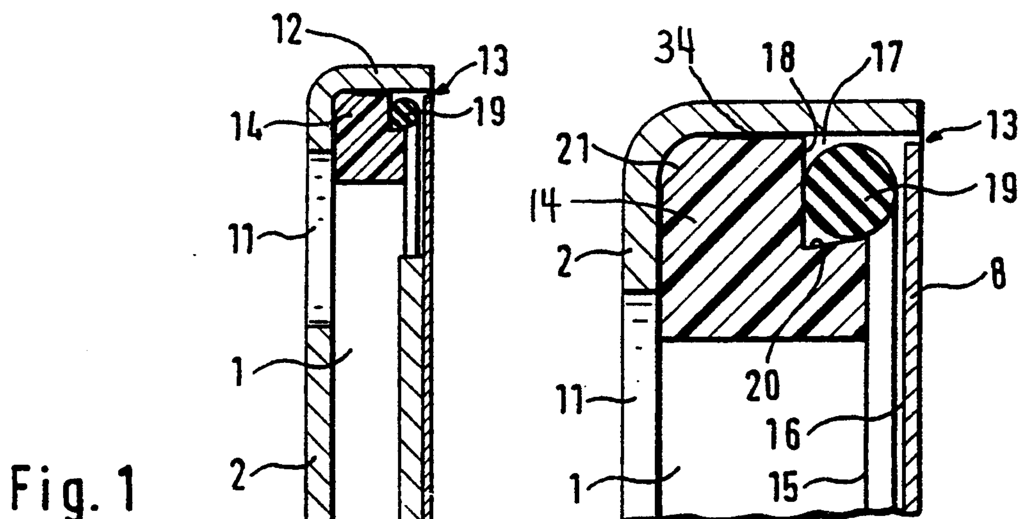
FIG. 2 shows an enlarged section view of the upper corner of FIG. 1.

The outer side 20 of the support body 14 between its top side 15 and the top side 18 of the recess 17 is shown in FIG. 2 to be conically expanded also toward the plane of the top side 15. The term "conically expanded"

means that the angle between top side 18 and outer side 20 is an acute angle less than 90°. The term "step-like" cross section means that surface 34, surface 18, surface 20 and surface 15 form a zigzag surface pattern.

On its outer side 20 facing the bottom of the casing, the support body 14 may have an end portion 21 for compensating for any irregularities of the casing or caused by welding seams, if any.

While only a single embodiment of the present invention has been shown and described, it is to be understood that many changes and modifications may be made thereunto without departing from the spirit and scope of the invention as defined in the appended claims.

What is claimed is:

1. A metering device having a vacuum pressure chamber formed between a trough-shaped casing and a revolving transporting disk, comprising an annular support body made of air-impermeable sealing material arranged along the inside of the trough-shaped casing, said annular support body having a top side ending at a small spacing from the underside of the transporting disk and support body having on its outer edge a recess with a top side and with a step-like cross section;

an O-ring made of air-impermeable, elastic material loosely resting on the top side of said recess and spaced from the underside of the transporting disk when vacuum pressure is not applied;

said O-ring having a cross sectional diameter greater than the spacing between the top side of the support body and the underside of the revolving transporting disk.

2. The metering device according to claim 1, wherein the support body has an outer side; and said outer side of the support body between its top side and the top side of the recess expands conically toward the plane of the top side of the support body.

3. The metering device according to claim 1, wherein said annular support body is made of plastic having a smooth surface.

4. The metering device according to claim 1, wherein said O-ring is made of natural rubber with a smooth surface.

5. A metering device having a vacuum pressure chamber formed between a stationary trough-shaped casing and a revolving transporting disk, the device comprising:

an annular support body made of air-impermeable sealing material arranged along an inside of the trough-shaped casing, said support body including;

(a) an outer edge provided with a recess and forming a step-like cross-section, (b) a first surface spaced from the transporting disk by a first distance, (c) a second surface, recessed from said first surface, and spaced from the transporting disk by a second distance, greater than said first distance, and (d) an outer side extending and conically expanding from said first surface to said second surface, said outer side and said first surface jointly forming a corner;

an O-ring having a cross-sectional diameter greater than said first distance and less than said second distance;

said O-ring being made of air-impermeable, elastic material and loosely resting on said outer side and said second surface and spaced from the transporting disk by a small distance when vacuum pressure is not applied; and when vacuum pressure is applied to the vacuum pressure chamber, said O-ring presses toward the space between said first surface and the transporting disk and away from said second surface, said O-ring makes linear contact with both said corner of said support body and the transporting disk, whereby relatively low frictional forces are generated by said O-ring on the revolving transporting disk.

* * * * *